US012555962B2

(12) United States Patent
Wang et al.

(10) Patent No.: US 12,555,962 B2
(45) Date of Patent: Feb. 17, 2026

(54) CIRCUIT BOARD CONNECTION STRUCTURE AND ROTARY PLUG CONNECTOR

(71) Applicant: Luxshare Precision Accessory (Suzhou) LTD., Suzhou (CN)

(72) Inventors: Zulong Wang, Changzhi (CN); Kai Xie, Changzhi (CN); Bicheng Li, Changzhi (CN)

(73) Assignee: LUXSHARE PRECISION ACCESSORY (SUZHOU) LTD., Suzhou (CN)

(*) Notice: Subject to any disclaimer, the term of this patent is extended or adjusted under 35 U.S.C. 154(b) by 484 days.

(21) Appl. No.: 18/091,144

(22) Filed: Dec. 29, 2022

(65) Prior Publication Data

US 2024/0039220 A1 Feb. 1, 2024

(30) Foreign Application Priority Data

Jul. 26, 2022 (CN) ......................... 202210883702.3

(51) Int. Cl.

| | |
|---|---|
| ***H01R 24/60*** | (2011.01) |
| ***H01R 13/04*** | (2006.01) |
| ***H01R 13/62*** | (2006.01) |
| ***H01R 13/66*** | (2006.01) |
| ***H01R 35/00*** | (2006.01) |

(52) U.S. Cl.

CPC ............. *H01R 24/60* (2013.01); *H01R 13/04* (2013.01); *H01R 13/6205* (2013.01); *H01R 13/665* (2013.01); *H01R 35/00* (2013.01)

(58) Field of Classification Search

CPC .... H01R 24/26; H01R 13/6205; H01R 13/04; H01R 13/665; H01R 35/00; H01R 35/04; H01R 24/60

USPC ............................................ 439/21, 22, 660

See application file for complete search history.

(56) References Cited

U.S. PATENT DOCUMENTS 7,802,995 B2 * 9/2010 Lai ......................... H01R 35/02 439/21

FOREIGN PATENT DOCUMENTS

| | | | | | |
|---|---|---|---|---|---|
| CN | 108281817 A | | 7/2018 | | |
| CN | 208478789 U | | 2/2019 | | |
| CN | 109494523 A | * | 3/2019 | ............. | H01R 13/60 |
| CN | 109888586 A | * | 6/2019 | ............. | H01R 35/04 |

* cited by examiner

*Primary Examiner* — Gary F Paumen

(74) *Attorney, Agent, or Firm* — Birch, Stewart, Kolasch & Birch, LLP

(57) ABSTRACT

A circuit board connection structure includes an adapter circuit board and an interface circuit board. The upper board face of the adapter circuit board is provided with a connection via, and an arcuate adapter pad coaxial with the connection via. A conductive pin is secured to the arcuate adapter pad. The conductive pin is provided with a protrusion. The lower board face of the interface circuit board is provided with a rotation shaft, and an arcuate interface pad coaxial with the rotation shaft. The rotation shaft is inserted into the connection via. The interface circuit board is configured to swing relative to the adapter circuit board about the axis of the rotation shaft. The protrusion is pressed against the arcuate interface pad and is configured to slide relative to the arcuate interface pad.

10 Claims, 3 Drawing Sheets

CIRCUIT BOARD CONNECTION STRUCTURE AND ROTARY PLUG CONNECTOR

CROSS-REFERENCE TO RELATED APPLICATION(S)

This application claims priority to Chinese Patent Application No. 202210883702.3 filed Jul. 26, 2022, the disclosure of which is incorporated herein by reference in its entirety.

TECHNICAL FIELD

The present disclosure relates to the field of data transmission accessories and, in particular, a circuit board connection structure and a rotary plug connector.

BACKGROUND

Due to the rapid development of electronic technologies and electronic products, various electronic devices are emerging. Electronic devices are driven by electrical energy. Under the current technical conditions, data line charging is still the mainstream. The latest Type-C connectors support positive and negative plug-in functions, and thus are increasingly popular with consumers and widely used in electronic products.

However, charging conditions of many electronic devices are too severe. When orientation of a charging interface cannot be changed, how to avoid long-time bending and twisting of a circuit board connection structure when charging an electronic device becomes a problem for users.

With regard to an existing circuit board connection structure, a connection cable is typically welded to a connector. As a result, the direction is fixed, and the connection cable cannot rotate relative to the connector. When this situation occurs, an electrical connection can be achieved only when the connection cable is bent, thereby increasing the risk of damage to the circuit board connection structure, resulting in a reduction in the service life of the circuit board connection structure.

SUMMARY

The present disclosure provides a circuit board connection structure and a rotary plug connector to reduce bending and twisting of the circuit board connection structure and reduce the risk of damage.

The present disclosure adopts the technical solutions below.

A circuit board connection structure includes an adapter circuit board and an interface circuit board. The upper board face of the adapter circuit board is provided with a connection via, and an arcuate adapter pad coaxial with the connection via. A conductive pin is secured to the arcuate adapter pad. The conductive pin is provided with a protrusion. The lower board face of the interface circuit board is provided with a rotation shaft, and an arcuate interface pad coaxial with the rotation shaft. The rotation shaft is inserted into the connection via, and the interface circuit board is configured to swing about the axis of the rotation shaft relative to the adapter circuit board, and the protrusion is pressed against the arcuate interface pad and is configured to slide relative to the arcuate interface pad.

A rotary plug connector includes a connection cable, an interface module, and the circuit board connection structure. The adapter circuit board is connected to the connection cable. The interface module includes an interface circuit board, and an interface body connected to the interface circuit board for connecting external devices.

REFERENCE LIST

Figure 1:
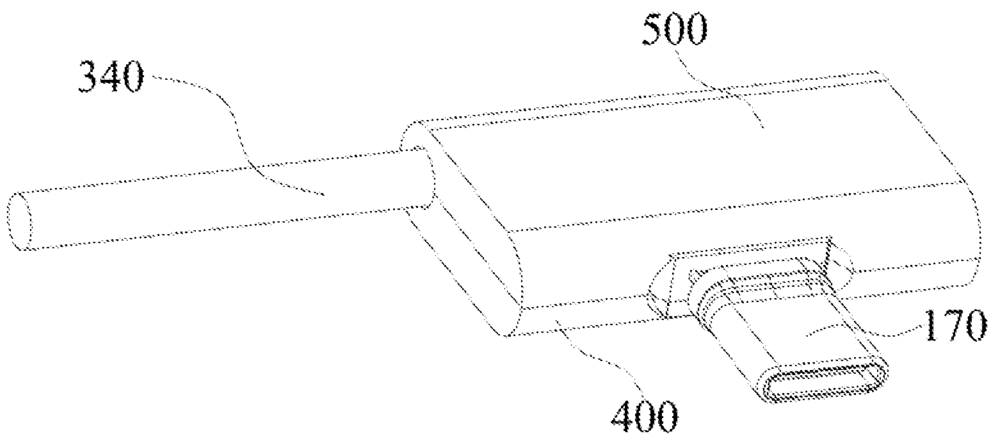
FIG. 1 is a view of a rotary plug connector according to embodiments of the present disclosure.

100 interface module
110 first interface pad
120 second interface pad
130 third interface pad
140 interface circuit board
150 rotation shaft
170 interface body
180 protective frame
190 first magnetic member
200 adapter circuit board
201 connection via
210 first adapter pad
211 first pin
220 second adapter pad
221 second pin
2211 second pin connection portion
2212 second pin protrusion
230 third adapter pad
231 third pin
240 first connection pad
250 second connection pad
260 second magnetic member
300 connection cable
311 first electrical connection line
312 first insulating jacket
321 second electrical connection line
322 second insulating jacket
332 third insulating jacket
340 cable protective jacket
400 lower protective shell
401 lower cable bypass hole
402 lower interface bypass hole
403 lower swing bypass hole
410 lower cable accommodation cavity
420 lower circuit board accommodation cavity
430 lower magnetic element accommodation cavity
500 upper protective shell
501 upper cable bypass hole
502 upper interface bypass hole
503 upper swing bypass hole
600 third magnetic member

DETAILED DESCRIPTION

To make solved problems, adopted solutions and achieved effects of the present disclosure clearer, the solutions in embodiments of the present disclosure is further described in detail in conjunction with the drawings. Apparently, the embodiments described below are part, not all, of embodiments of the present disclosure. Based on embodiments of the present disclosure, all other embodiments obtained by those of ordinary skill in the art without creative work are within the protection scope of the present disclosure.

In the description of the present disclosure, unless otherwise expressly specified and limited, the term "connected to each other", "connected", or "fixed" is to be construed in a broad sense, for example, as permanently connected, detachably connected, or integrated; mechanically connected or electrically connected; directly connected to each other or indirectly connected to each other via an intermediary; or internally connected or interactional between two components. For those of ordinary skilled in the art, the above terms can be construed depending on specific contexts.

In the present disclosure, unless otherwise expressly specified and limited, when a first feature is described as "on" or "below" a second feature, the first feature and the second feature may be in direct contact, or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Technical solutions of the present disclosure will be further described below through embodiments in conjunction with the drawings.

Figure 2:
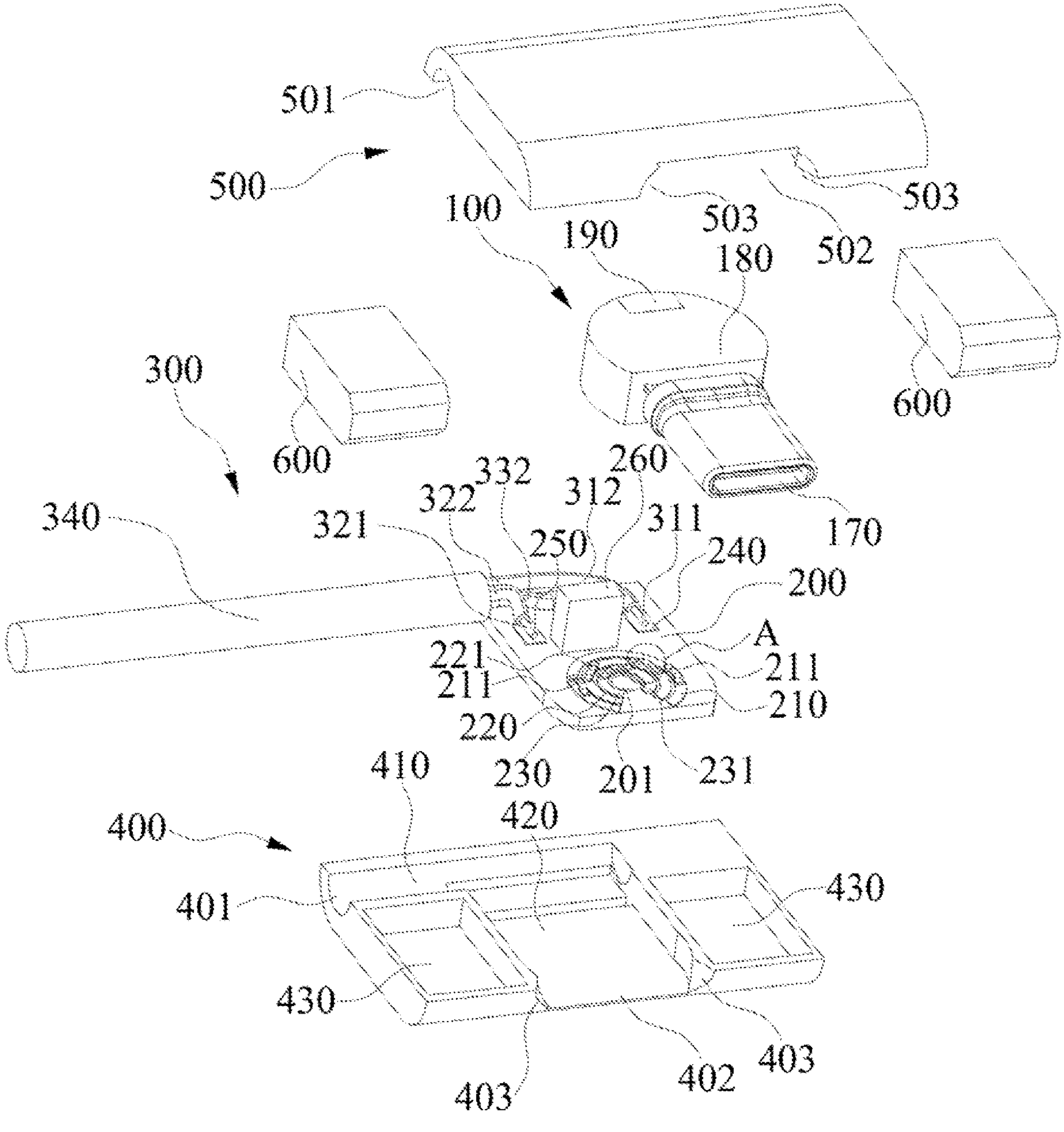
FIG. 2 is an exploded view of the rotary plug connector according to embodiments of the present disclosure.
Figure 3:
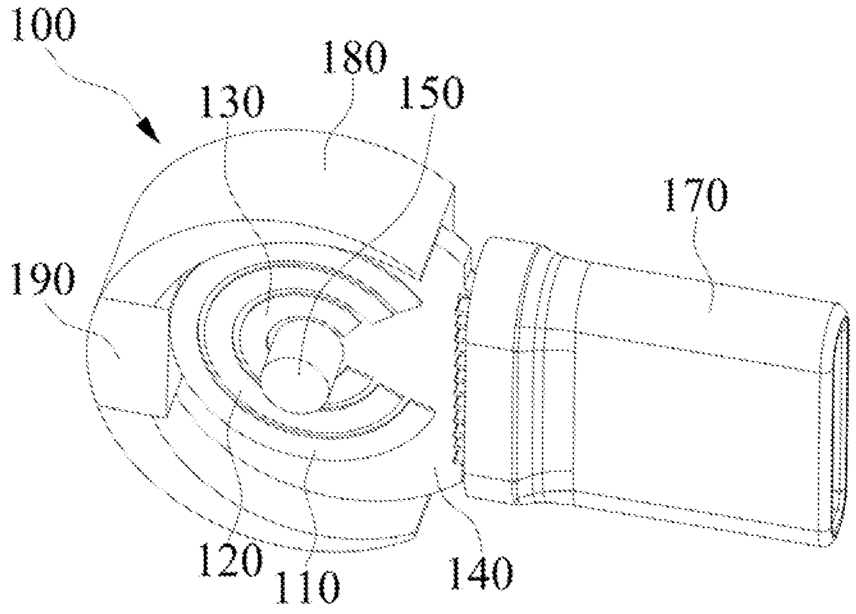
FIG. 3 is a view of an interface module according to embodiments of the present disclosure.

As shown in FIGS. 1 to 3, the present embodiment provides a circuit board connection structure, including an adapter circuit board 200 and an interface circuit board 140. The upper board face of the adapter circuit board 200 is provided with a connection via 201, and an arcuate adapter pad coaxial with the connection via 201. A conductive pin is secured to the arcuate adapter pad. The conductive pin is provided with a protrusion. The lower board face of the interface circuit board 140 is provided with a rotation shaft 150, and an arcuate interface pad coaxial with the rotation shaft 150. The rotation shaft 150 is inserted into the connection via 201. The interface circuit board 140 is configured to swing about the axis of the rotation shaft 150 relative to the adapter circuit board 200. The protrusion is pressed against the arcuate interface pad and is configured to slide relative to the arcuate interface pad.

The circuit board connection structure adopts a design that the rotation shaft 150 is inserted into the connection via 201, ensuring that the interface circuit board 140 can smoothly swing about the axis of the rotation shaft 150 relative to the adapter circuit board 200. The arcuate adapter pad coaxial with the connection via 201, and the arcuate interface pad coaxial with the rotation shaft 150 are disposed, ensuring the connecting ability between the arcuate adapter pad and the arcuate interface pad. In this manner, the arcuate adapter pad and the corresponding arcuate interface pad can contact each other smoothly. By providing the conductive pin, the connection between the arcuate adapter pad and the corresponding arcuate interface pad are changed, ensuring that the two pads are always in contact. The above arrangement improves the connection effect between the arcuate adapter pad and the arcuate interface pad, and ensures that the electrical connection between the interface body 170 and the connection cable 300 can be successfully completed. In this structure, a protrusion is pressed against the arcuate interface pad and is configured to slide relative to the arcuate interface pad so that the risk of damage and deformation of the pin is reduced, the effect of electrical connection between the arcuate adapter pad and the arcuate interface pad is improved, smooth operation of the structure is ensured, and the service life is prolonged.

In the present embodiment, the conductive pin also includes two connection portions located on two sides of the protrusion respectively, and the two connection portions are secured to the arcuate adapter pad. The structural improvement of the conductive pin ensures that the arcuate adapter pad and the arcuate interface pad can be electrically connected through the conductive pin. The selection of the specific structure of the conductive pin and the design of the connection relationship improve the situation of the forces applied to the conductive pin during the reciprocation of the arcuate interface pad, extending the service life of the rotary plug connector.

Preferably, the conductive pin is formed by bending a metal sheet, the two connection portions are formed by bending both ends of the metal sheet downwards, and the protrusion is formed by bending the middle of the metal sheet upwards.

The method of manufacturing the conductive pin by bending a metal sheet is simple and efficient so that the manufacturing difficulty of the conductive pin and the production cost are greatly reduced, and the production efficiency is improved.

Figure 4:
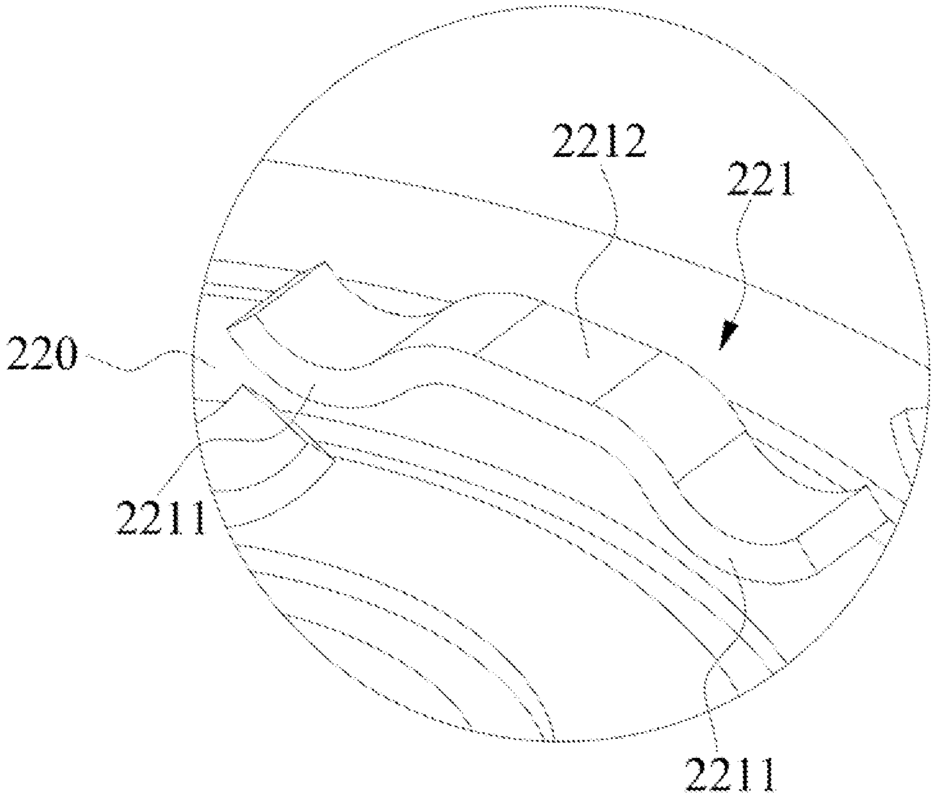
FIG. 4 is an enlarged view of A of FIG. 2.

As shown in FIG. 4, the conductive pin in the figure is defined as a second pin 221, the arcuate adapter pad is defined as a second adapter pad 220, both connection portions of the second pin 221 are defined as the second pin connection portions 2211, and the protrusion of the second pin 221 is defined as the second pin protrusion 2212. Specifically, both second PIN pins connection portions 2211 are welded to the second adapter pad 220.

With continued reference to FIGS. 1 to 3, the present embodiment provides a rotary plug connector including a connection cable 300, an interface module 100, and the circuit board connection structure. An adapter circuit board 200 is connected to the connection cable 300. The interface module 100 includes an interface circuit board 140, and an interface body 170 connected to the interface circuit board 140. The interface body 170 is used for connecting external devices.

The rotary plug connector adopts a design that the interface module 100 swings about the axis of the rotation shaft 150 relative to the adapter circuit board 200 so that the relative position of the interface body 170 and the connection cable 300 can be adjusted, thereby ensuring a smooth connection of the connection cable 300 to the interface body 170. The above structural improvement can meet set requirements for a rotary plug connector when there is a special space requirement, and the line direction of a connection cable 300 is changed by adjusting orientation of an interface body 170, thereby adapting to arrangement of a connection cable 300 in different spaces and reducing the swing requirement of the connection cable 300. The above design reduces the bending and twisting of a rotary plug connector when installed in external environment, thereby reducing the risk of damage to the plug connector and prolonging the service life.

Preferably, the upper board face of the adapter circuit board 200 is provided with at least one arcuate adapter pad coaxial with the connection via 201, and the lower board face of the interface circuit board 140 is provided with the arcuate interface pad coaxial with the rotation shaft 150. The arcuate interface pads and the arcuate adapter pads have the same number, and are disposed directly opposite to each other in a one-to-one correspondence. Each arcuate adapter pad is in contact with a corresponding arcuate interface pad through the conductive pin.

Further, three arcuate adapter pads are provided. The three arcuate adapter pads are a first adapter pad 210, a second adapter pad 220, and a third adapter pad 230 that are disposed from the outside to the inside sequentially. Three arcuate interface pads are provided. The three arcuate interface pads are a first interface pad 110, a second interface pad 120, and a third interface pad 130 that are disposed from the outside to the inside sequentially. The first adapter pad 210 is in contact with the first interface pad 110 through the first pin 211, the second adapter pad 220 is in contact with the second interface pad 120 through the second pin 221, and the third adapter pad 230 is in contact with the third interface pad 130 through the third pin 231. Specifically, one third pin 231 is provided, and two first pins 211 and two second pins 221 are provided. When the interface circuit board 140 swings within a predetermined range relative to the adapter circuit board 200, the two first pins 211 are always snapped on the first interface pad 110 at the same time. The two second pins 221 are always snapped on the second interface pad 120 at the same time, and one third pin 231 is always snapped on the third interface pad 130.

The above design ensures that each arcuate adapter pad can be connected to a corresponding arcuate interface pad, thereby further ensuring the electrical connection effect of the interface body 170 and the connection cable 300.

The layout that multiple arcuate pads are disposed from the outside to the inside sequentially reduces the space occupied by the adapter circuit board 200 and the interface circuit board 140, and reduces the production cost of the adapter circuit board 200 and the interface circuit board 140.

In this embodiment, the connection cable 300 includes a first electrical connection line 311, a second electrical connection line 321, a third electrical connection line, and a cable protective jacket 340. A first insulating jacket 312 is sleeved outside the first electrical connection line 311, a second insulating jacket 322 is sleeved outside the second electrical connection line 321, and a third insulating jacket 332 is sleeved outside the third electrical connection line. The cable protective jacket 340 is sleeved outside the first insulating jacket 312, the second insulating jacket 322, and the third insulating jacket 332.

Preferably, an adapter circuit board 200 is also provided with a first connection pad 240, a second connection pad 250, and a third connection pad. The first adapter pad 210 is electrically connected to the first connection pad 240. The first electrical connection line 311 is welded to the first connection pad 240. The second adapter pad 220 is electrically connected to the second connection pad 250. The second electrical connection line 321 is welded to the second connection pad 250. The third adapter pad 230 is electrically connected to the third connection pad, and the third electrical connection line is welded to the third connection pad. The first interface pad 110, the second interface pad 120, and the third interface pad 130 are electrically connected to the interface body 170. Specifically, the first electrical connection line 311 is a configuration channel (CC) wire, the second electrical connection line 321 is a voltage bus (Vbus) wire, and the third electrical connection line is a ground (GND) wire.

The present embodiment also includes a protective shell, provided with a cable accommodation cavity and a circuit board accommodation cavity. Part of the connection cable 300 extends into the cable accommodation cavity, the adapter circuit board 200 and part of the interface module 100 are disposed within the circuit board accommodation cavity, and the interface module 100 has part having the interface body 170 and extending out of the protective shell. The protective shell protects the adapter circuit board 200 and the interface module 100, and provides an accommodation space for the adapter circuit board 200 and the interface module 100, thereby reducing risk that the adapter circuit board 200 and the interface module 100 are accidentally detached, ensuring smooth operation of the rotary plug connector, and reducing the maintenance frequency.

Further, the circuit board accommodation cavity communicates with external environment through an interface bypass hole, and the interface body 170 passes through the interface bypass hole. When the interface module 100 swings about the axis of the rotation shaft 150, the interface module 100 is configured to stop when the interface body 170 abuts against a sidewall of the interface bypass hole. The design that the swing range is defined by rigid contact effectively simplifies the structure of the rotary plug connector, and also circumvents the situation where the interface circuit board 140 is unexpectedly out of range. The above design is simple and reliable, the production cost is low, and the operation stability is high.

Further, the interface bypass hole is provided with two sidewalls, and the two sidewalls of the interface bypass hole are opposite to each other. The interface module 100 is configured to swing between the first extreme position and the second extreme position. When the interface module 100 is at the first extreme position, the interface module 100 abuts against one of the sidewalls of the interface bypass hole, and when the interface module 100 is at the second extreme position, the interface module 100 abuts against the other of the sidewalls of the interface bypass hole. The above design is simple, reliable, and accurately defines two extreme positions of the interface module 100 in the swing process, and thus defines the swing trajectory of the interface module 100, thereby ensuring the ability to adjust the relative angle between the orientation of the interface body 170 and the line direction of the connection cable 300.

Specifically, when the interface module 100 swings from the first extreme position to the second extreme position, the interface module 100 is rotated by 45°.

Preferably, the protective shell is provided with two swing bypass grooves, each of the swing bypass grooves communicating with one sidewall of the interface bypass hole. When the interface module 100 abuts against the sidewall of the interface bypass hole, a lateral surface of the interface body 170 abuts against the groove wall of the swing bypass groove. Specifically, the groove wall of the swing bypass groove is an arcuate surface. The above design provides a bypass space for the interface body 170 and external devices, thereby reducing interference of the interface body 170 with the protective shell during rotation.

Preferably, the protective shell is provided with a magnetic member accommodation cavity. The magnetic member accommodation cavity is provided with a third magnetic member 600, and the third magnetic member 600 is capable attracting external magnetic devices. The third magnetic member 600 is provided to magnetically attract external devices when the rotary plug connector is operated, and thus the lock operation on the plug connector can be achieved. The usage is convenient, the structure is simple, and the production cost is low.

Further, the protective shell includes a lower protective shell 400 and an upper protective shell 500. The lower protective shell 400 is provided with a lower cable accommodation groove 410, a lower circuit board accommodation cavity 420 and a lower magnetic element accommodation cavity 430. The upper protective shell 500 is provided with an upper cable accommodation cavity, an upper circuit board accommodation cavity and an upper magnetic element accommodation cavity. The lower cable accommodation cavity 410 and the upper cable accommodation cavity form a cable accommodation cavity. The lower circuit board accommodation cavity 420 and the upper circuit board accommodation cavity form a circuit board accommodation cavity. The lower magnetic member accommodation cavity 430 and the upper magnetic element accommodation cavity form a magnetic member accommodation cavity.

Specifically, the lower cable accommodation cavity 410 communicates with a lateral surface of the lower protective shell 400 through the lower cable bypass hole 401. The upper cable accommodation cavity communicates with a lateral surface of the upper protective shell 500 through an upper cable bypass hole 501. The lower circuit board accommodation cavity 420 communicates with a lateral surface of the lower protective shell 400 through a lower interface bypass hole 402. The upper circuit board accommodation cavity communicates with a lateral surface of the upper protective shell 500 through the upper interface bypass hole 502. Two lower swing bypass holes 403 communicate with a sidewall of two lower interface bypass holes 402. Two upper swing bypass holes 503 communicate with sidewalls of two upper interface bypass holes 502. The lower cable bypass hole 401 is spliced with the upper cable bypass hole 501 to form a cable bypass hole. The connection cable 300 extends into the cable accommodation cavity through the cable bypass hole. The lower interface bypass hole 402 is spliced with the upper interface bypass hole 502 to form the interface bypass hole. The upper swing bypass hole 503 is spliced with the lower swing bypass hole 403 to form the swing bypass groove. The split design of the protective shell greatly reduces the difficulty in producing the protective shell, reduces the processing cost, and improves the manufacturing efficiency.

In the present embodiment, a first magnetic member 190 is secured to the interface circuit board 140, and a second magnetic member 260 is secured to the adapter circuit board 200; and a restoration position is set between the first extreme position and the second extreme position, the distance between the first magnetic member 190 and the second magnetic member 260 is smallest when the interface module 100 is at the restoration position, and the first magnetic member 190 is configured to drive the interface module 100 to swing towards the restoration position. The above design enables the interface module 100 to automatically move to the restoration position without being affected by external environment, thereby completing the action of automatically correcting the interface module 100. The above design is simple and reliable, which reduces the difficulty for an operator to adjust the position of the interface module 100, simplifies the process of connecting the interface body 170 to external device, and improves the user experience of the operator.

Specifically, the upper board face of the interface circuit board 140 is nested in a protective frame 180, and the first magnetic member 190 is embedded on the protective frame 180.

In other embodiments of the present embodiment, two third magnetic members 600 are repulsive to the first magnetic member 190, and the interface circuit board 200 is not provided with a magnetic member. When two third magnetic members 600 push the first magnetic member 190 to stop at a stress-balanced position, the interface module 100 is at the restoration position. By designing a way that two third magnetic members 600 repel the first magnetic member 190 in a balanced way, the positioning operation of the first magnetic member 190 is completed, and the automatic correction operation of the interface module 100 is achieved. The above design is simple and reliable, the production cost is low, the space occupied is small, and the operation of adjusting the position of the interface module 100 can be accurately and stably completed.

The circuit board connection structure adopts a design that a rotation shaft is inserted into a connection via, ensuring that the interface circuit board can smoothly swing about the axis of the rotation shaft relative to an adapter circuit board. An arcuate adapter pad coaxial with the connection via, and an arcuate adapter pad coaxial with the rotation shaft are disposed opposite, ensuring the connecting ability between the arcuate adapter pad and the arcuate interface pad. In this manner, the arcuate adapter pad and the corresponding arcuate interface pad can contact each other smoothly. By providing a conductive pin, the connection between the arcuate adapter pad and the corresponding arcuate interface pad can be changed, ensuring that the two pads are always in contact. The above arrangement improves the connection effect between the arcuate adapter pad and the arcuate interface pad, and ensures that the electrical connection between the interface body and the connection cable can be successfully completed. In this structure, a protrusion is pressed against the arcuate interface pad and is configured to slide relative to the arcuate interface pad so that the risk of damage and deformation of the pin is reduced, the effect of electrical connection between the arcuate adapter pad and the arcuate interface pad is improved, smooth operation of the structure is ensured, and the service life is prolonged.

The rotary plug connector adopts a design that an interface module swings about the axis of a rotation shaft relative to an adapter circuit board so that the relative position of the interface body and the connection cable can be adjusted, thereby ensuring a smooth connection of the connection cable to the interface body. The above structural improvement can meet set requirements for a rotary plug connector when there is a special space requirement, and change line direction of a connection cable by adjusting orientation of an interface body, thereby adapting to arrangement of a connection cable in different spaces and reducing the swing requirement of the connection cable. The above design reduces the bending and twisting of a rotary plug connector when installed in external environment, thereby reducing the risk of damage to the plug connector and prolonging the service life.

What is claimed is:

1. A circuit board connection structure, comprising:

an adapter circuit board, wherein a connection via is formed in an upper board face of the adapter circuit board, an arcuate adapter pad coaxial with the connection via is disposed on the upper board face of the adapter circuit board, a conductive pin is secured to the arcuate adapter pad, and the conductive pin is provided with a protrusion; and an interface circuit board, wherein a rotation shaft protrudes from a lower board face of the interface circuit board, and an arcuate interface pad coaxial with the rotation shaft is disposed on the lower board face of the interface circuit board, wherein the rotation shaft is inserted into the connection via, the interface circuit board is configured to swing relative to the adapter circuit board about an axis of the rotation shaft, and the protrusion is pressed against the arcuate interface pad and is configured to slide relative to the arcuate interface pad;

wherein the conductive pin further comprises two connection portions, wherein the two connection portions are located on two sides of the protrusion respectively, and the two connection portions are secured to the arcuate adapter pad.

2. The circuit board connection structure according to claim 1, wherein the conductive pin is formed by bending a metal sheet, the two connection portions are formed by bending two ends of the metal sheet downwards, and the protrusion is formed by bending a middle of the metal sheet upwards.

3. A rotary plug connector, comprising a connection cable, an interface module, and the circuit board connection structure according to claim 1, wherein the adapter circuit board is connected to the connection cable, and the interface module comprises the interface circuit board, and an interface body connected to the interface circuit board, wherein the interface body is configured to be connected to an external device.

4. The rotary plug connector of claim 3, further comprising a protective shell provided with a cable accommodation cavity and a circuit board accommodation cavity, wherein part of the connection cable extends into the cable accommodation cavity, the adapter circuit board and part of the interface module are disposed within the circuit board accommodation cavity, and another part of the interface module extends out of the protective shell, wherein the another part has the interface body.

5. The rotary plug connector of claim 4, wherein the circuit board accommodation cavity communicates with external environment through an interface bypass hole, the interface body passes through the interface bypass hole, and when the interface module swings about the axis of the rotation shaft, the interface module is configured to stop when the interface body abuts against a sidewall of the interface bypass hole.

6. The rotary plug connector of claim 5, wherein the interface bypass hole is provided with two sidewalls that are opposite to each other, and the interface module is configured to swing between a first extreme position and a second extreme position, and the interface module is configured to abut against one of the two sidewalls of the interface bypass hole when the interface module is at the first extreme position, and the interface module is configured to abut against the other of the two sidewalls of the interface bypass hole when at the second extreme position.

7. The rotary plug connector according to claim 6, wherein the protective shell is provided with two swing bypass grooves, wherein each swing bypass groove of the two swing bypass grooves communicates with a respective one of the two sidewalls of the interface bypass hole, and when the interface module abuts against one of the two sidewalls of the interface bypass hole, a lateral surface of the interface body is configured to abut against a groove wall of a respective one of the two swing bypass grooves.

8. The rotary plug connector according to claim 6, wherein a first magnetic member is secured to the interface circuit board, and a second magnetic member is secured to the adapter circuit board; and a restoration position is set between the first extreme position and the second extreme position, a distance between the first magnetic member and the second magnetic member is configured to be smallest when the interface module is at the restoration position, and the first magnetic member is configured to drive the interface module to swing towards the restoration position.

9. The rotary plug connector according to claim 4, wherein the protective shell is provided with a magnetic member accommodation cavity, a third magnetic member is disposed in the magnetic member accommodation cavity, and the third magnetic member is configured to attract an external magnetic device.

10. The rotary plug connector according to claim 3, wherein the conductive pin is formed by bending a metal sheet, the two connection portions are formed by bending two ends of the metal sheet downwards, and the protrusion is formed by bending a middle of the metal sheet upwards.

* * * * *